United States Patent
Kenny

(10) Patent No.: US 10,104,869 B2
(45) Date of Patent: Oct. 23, 2018

(54) BRANDING BRACKET

(71) Applicant: Brian Kenny, Schaller, IA (US)

(72) Inventor: Brian Kenny, Schaller, IA (US)

( * ) Notice: Subject to any disclaimer, the term of this patent is extended or adjusted under 35 U.S.C. 154(b) by 322 days.

(21) Appl. No.: 15/003,173

(22) Filed: Jan. 21, 2016

(65) Prior Publication Data

US 2016/0212972 A1 Jul. 28, 2016

Related U.S. Application Data

(60) Provisional application No. 62/108,809, filed on Jan. 28, 2015.

(51) Int. Cl.
*A01K 11/00* (2006.01)

(52) U.S. Cl.
CPC .................... *A01K 11/005* (2013.01)

(58) Field of Classification Search
CPC .......... A01K 11/005; B44B 7/02; H05B 3/30; H05B 3/20; H05B 3/06
See application file for complete search history.

(56) References Cited

U.S. PATENT DOCUMENTS

| | | | | |
|---|---|---|---|---|
| 3,216,352 A | * | 11/1965 | Schnackel | B41K 1/40 101/333 |
| 4,036,128 A | * | 7/1977 | Easton | A01K 11/005 101/29 |
| 9,125,379 B1 | * | 9/2015 | Levy | B44B 7/02 |
| 2005/0166769 A1 | * | 8/2005 | Alphandary | B44B 7/02 101/31 |

* cited by examiner

*Primary Examiner* — David Banh
(74) *Attorney, Agent, or Firm* — Zarley Law Firm, P.L.C.

(57) ABSTRACT

A branding bracket is provided that has a bracket assembly and branding irons. The bracket assembly has a guide plate having two or more notches cut out of a top surface that receive the shaft of a branding iron. Guides are attached to the rear surface of the guide plate. When a branding iron is placed in the notch, a sleeve positioned on the shaft of the branding iron is slid over the guide to lock the branding iron to the bracket assembly, while still allowing the branding irons to move independently of one another. In one arrangement, the guide plate has multiple notches to allow the use of different sized branding irons, such as 3", 4" and 5" irons.

14 Claims, 5 Drawing Sheets

BRANDING BRACKET

CROSS REFERENCE TO RELATED APPLICATION

This application claims the benefit of U.S. Provisional Application No. 62/108,809 filed Jan. 28, 2015, incorporated by reference herein.

BACKGROUND OF THE INVENTION

This invention is directed to a branding device, and more particularly to a branding bracket.

Livestock branding is the practice of imprinting or marking livestock with a unique identifier to allow simple identification of who owns the particular livestock. Branding is accomplished by heating a brand until the point that when it is applied to the skin of the animal it burns the skin leaving a scar of the brand on the animal's skin. Alternatively, freeze branding cools the brand with a coolant such as dry ice. The brand is placed on a portion of the animal's skin and results in the animal's hair growing in with a lighter pigment where the brand has been placed.

Brands often use an alphanumeric identification system that requires numerous characters to be branded into the livestock. Additionally, brands can incorporate unique symbols, such as logos. Therefore, conventional branding requires that each character of the brand be heated or cooled, and then applied, separately. This results in a time-consuming process that results in decreased efficiency and greater lengths of discomfort to the animal. Accordingly, a need exists for a branding bracket that addresses these deficiencies.

Therefore a primary object of this invention is to provide a branding bracket that improves upon the state of the art.

It is another object of this invention to provide a branding bracket that allows the application of multiple branding irons at once.

It is yet another object of this invention to provide a branding bracket that is more efficient.

It is another object of this invention to provide a branding bracket that allows independent movement of branding irons.

It is yet another object of this invention to provide a branding bracket that reduce the duration of animal discomfort.

It is another object of this invention to provide a branding bracket that allows for rapid change in branding irons.

It is yet another object of this invention to provide a branding bracket that accommodates different sizes of brands.

It is another object of this invention to provide a branding bracket that is comfortable for the user to use.

It is yet another object of this invention to provide a branding bracket that is easy to use.

It is another object of this invention to provide a branding bracket that is inexpensive.

These and other object, features, and advantages of the present invention will become apparent from the following.

BRIEF SUMMARY OF THE INVENTION

The present invention relates to a branding bracket. The branding bracket includes a bracket assembly and a branding iron. In one embodiment of the present invention, the branding bracket has a pair of notches cut away from the top surface of a guide plate. Attached to the rear side of the guide plate are guides that are aligned with the notches. The guides extend outwards from the guide plate in a generally perpendicular direction.

The branding iron includes a shaft, a sleeve, and an iron. The iron is the portion that is actually placed against the animal to cause the brand to be made. The sleeve encircles the shaft. The branding iron is placed such that the shaft is received through the groove with the handle of the branding iron to the rear of the guide plate and the iron to the front of the guide plate. The sleeve is slid over the shaft and the guide, preventing the shaft from being lifted off of the guide, but still permitting the back and forth movement of the branding iron and can move independently if more than one branding iron is being used. Because the iron is larger than the notch, however, the iron cannot pass the guide plate.

In another arrangement, the guide plate has a plurality of notches positioned in the top of the surface. The first notch is positioned on one side of the bracket and the remaining notches are offset to the other side of the guide plate at even interval. In this arrangement, branding irons can be selectively placed in the offset set of notches to accommodate different sizes of irons. For example, if a small set of irons are being used, an iron is placed in the first notch and the next closest notch. If larger irons are used, the first notch is used in conjunction with a notch positioned further out.

DETAILED DESCRIPTION OF THE PREFERRED EMBODIMENT

Figure 1:
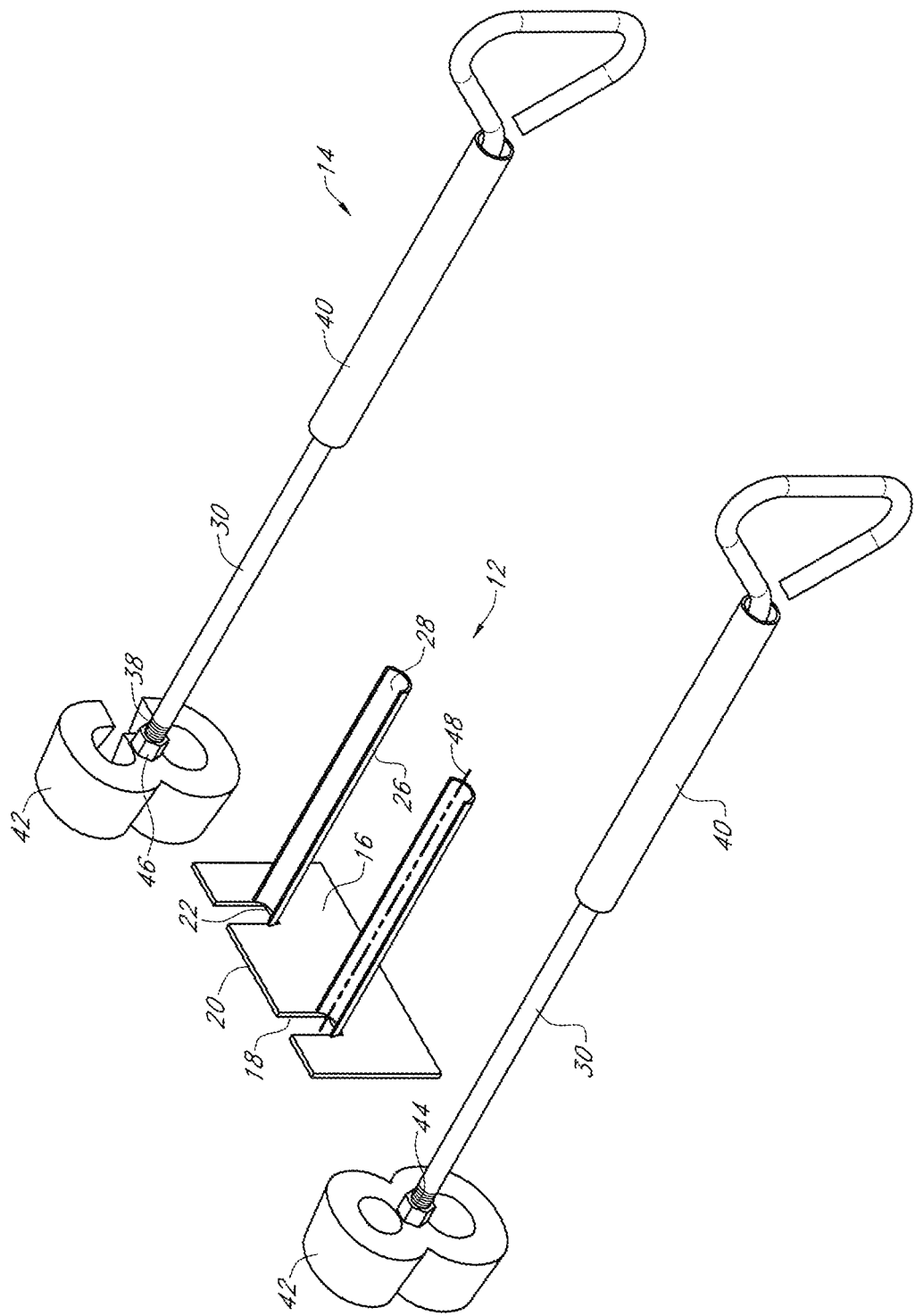
FIG. 1 is a perspective view of a branding bracket.
Figure 2:
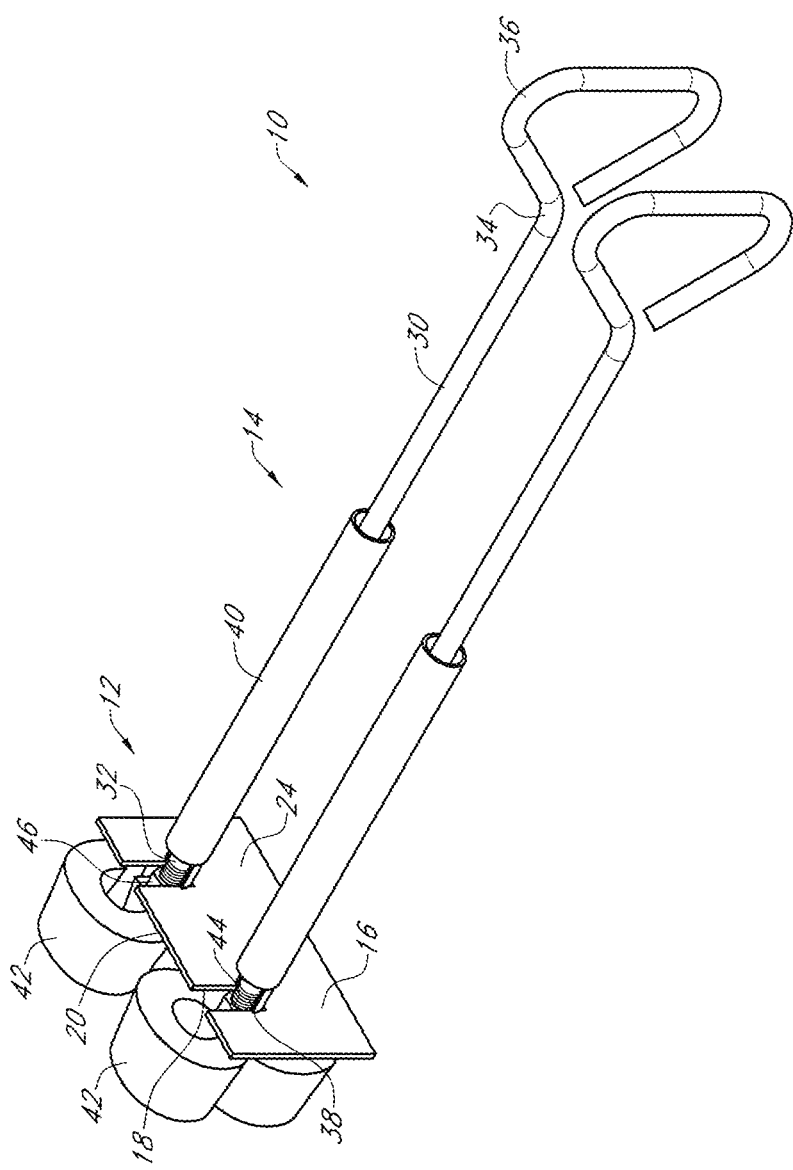
FIG. 2 is a perspective view of a branding bracket.
Figure 3A:
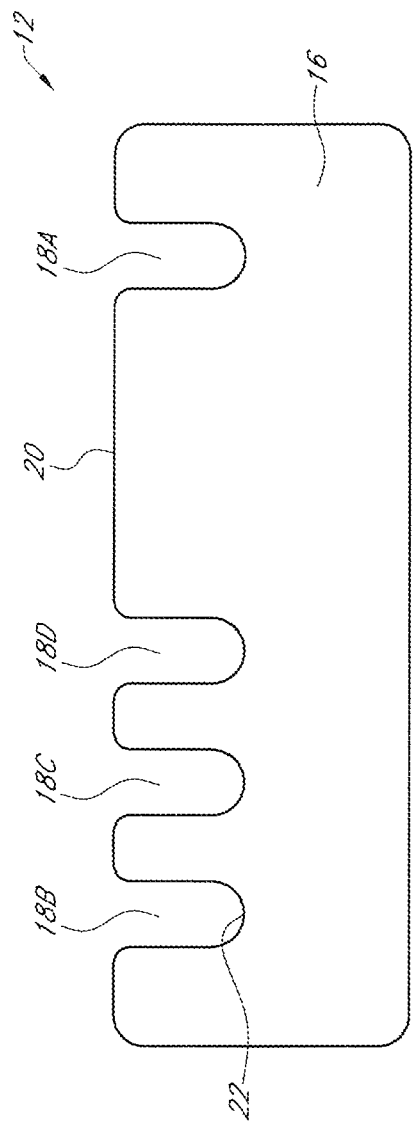
FIG. 3A is a front view of a branding bracket.
Figure 3B:
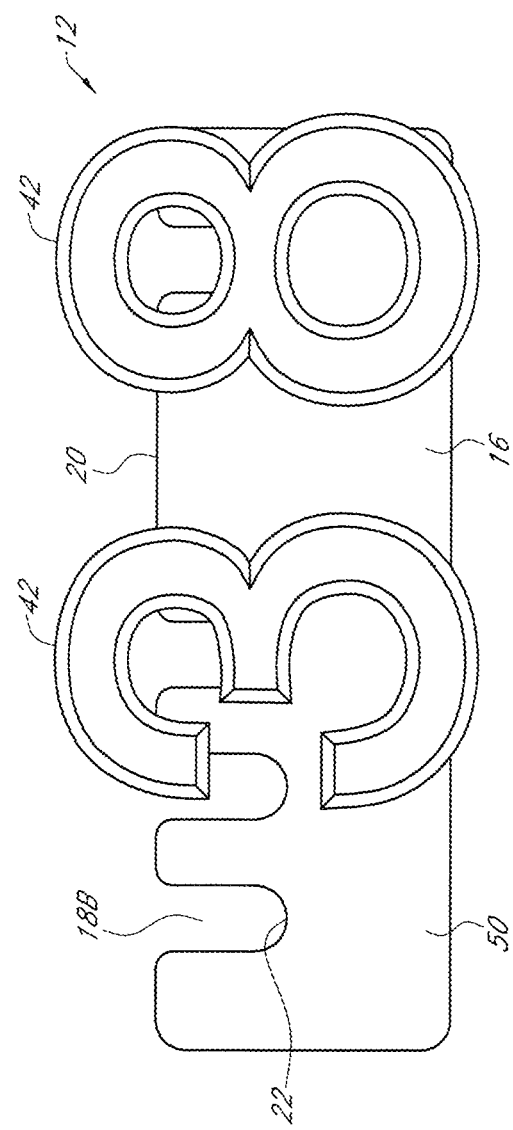
FIG. 3B is a front view of a branding bracket.
Figure 4:
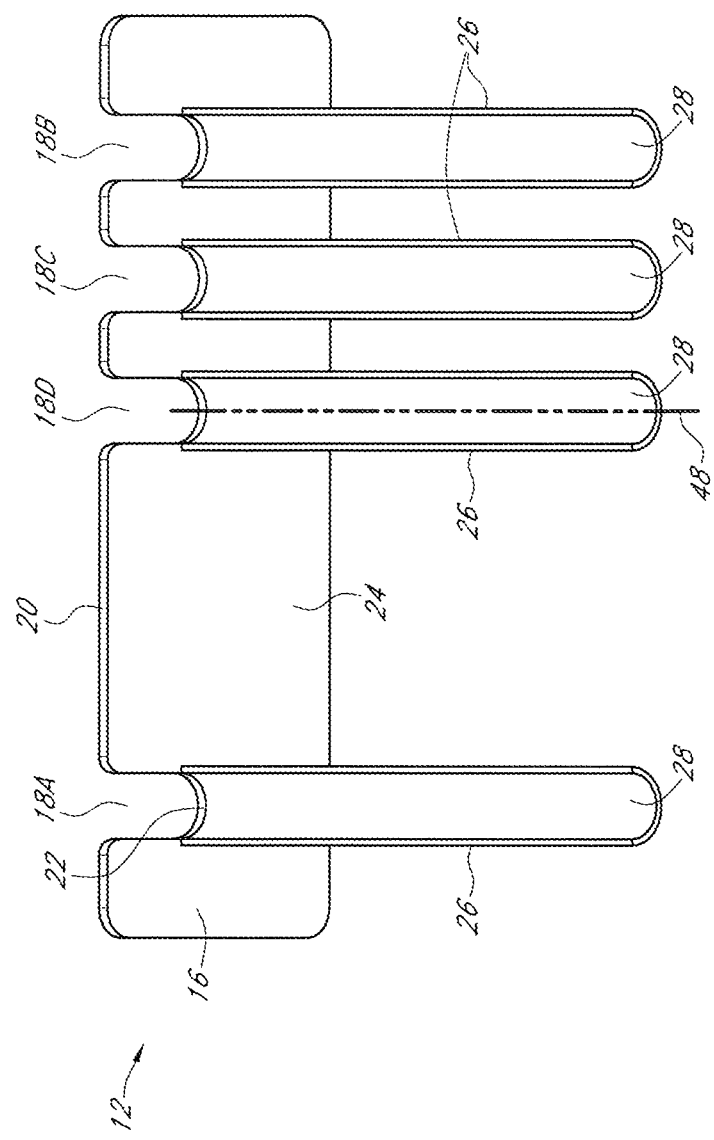
FIG. 4 is a perspective view of a branding bracket.

Referring to the Figures, a branding bracket 10 is disclosed and is comprised of a bracket assembly 12 and one or more branding irons 14. The bracket assembly 12 includes a guide plate 16 that can be made of flat iron or any other suitable material. In one arrangement, the guide plate 16, has a flat planar surface, but may have other shapes. One or more notches or cutouts 18 are cut from a top surface 20 of the guide plate 16 and extend downwardly. The notches 18 can terminate in a rounded bottom 22, but can alternatively terminate in any shape, such as a pointed triangular shape or a flat rectangular shape.

Attached to a rear side 24 of the guide plate 16 is at least one guide 26 that extends perpendicularly outward. In one arrangement, the guide 26 is welded flushly to the rear side 24 guide plate 16 adjacent to and just below the bottom 22 of the notches 22. The guide 26 has a slot or groove 28 that is similar to the shape of the bottom 22 of the notches 18 and the branding irons 14. In one arrangement, the groove 28 is rounded to match the rounded bottom 22 of the notches 18, such that the groove 28 is nearly identical to the contour of the notches 18. In one embodiment, the guide 26 is 5.25" long.

The branding iron 14 has a shaft 30 having a first end 32 and a second end 34. In one arrangement, the shaft is cylindrical and is sized and shaped such that it conforms with the bottom 22 of the notches 18 and the groove 28 of the guide 26. The first end 32 connects to a handle 36. Alternatively, the shaft 30 and handle 36 are of a single-body design, in such an arrangement, the first end 32 of the shaft 30 is bent to form the handle 36. The handle 36, in one arrangement, is triangular in shape. In one arrangement, the handle 36 is a rounded triangle, which provides additional comfort to the user when handling the branding iron 14. The second end 34 of the shaft 30 terminates in a threaded portion 38. The shaft 30 is sized and shaped to fit within the groove 28 of the guide plate 16, as well as the notch 18 and rest at the bottom 22 of the notch 18.

Received over the shaft 30 is a removable sleeve 40 that is a lightweight galvanized metal such as iron or steel, but in other embodiments can be made of any suitable material. The sleeve 40 is sized and shaped to fit over the shaft 30 and guides 26 in order to hold the shaft in place when the sleeve is received over both the shaft 30 and the guide 26 in a locked position. The sleeve 40 is a sufficient length to not obstruct the removal of the branding irons 14 from the guide plate 16, thereby allowing for quick removal and reloading of the bracket assembly 14. In one arrangement, the sleeve 40 is of a sufficient length to overlap the length of the guides 26 when abutting the rear side 24 of the guide plate 16. In one embodiment, the shaft 30 has a length of 13.50", excluding the handle 36 and threaded portion 38, and the sleeve 40 is 6.50" long.

Connected to the shaft 30 at the second end 32 is a brand or iron 42. The iron 32 can be of any shape and size, such as an alphanumerical character, a logo, or shape, or combination thereof used to brand an animal such a cow. The iron 42 in one arrangement has a maximum dimension of 3", but in other embodiments has a maximum dimension of 4", 5", 6", and greater. In one arrangement, the iron 42 has an opening 44 that is threaded and threadedly connects to the threaded portion 38 of the shaft 30. Alternatively, a connector 46, such as a nut, is attached to the iron 42 to connect to the shaft 30.

In one illustrative example, the guide plate 16 is 4.75" wide by 2.50" tall with two 1.00" deep notches 18 that are 0.50" wide that are inset 0.88" from the sides of the guide plate 16. In this embodiment the notches 18 are spaced apart 2.50". In this arrangement, the distance between a central axis 48 of the notches 18 is 3.00" apart in order to accommodate 3" irons 42 being attached to shafts 30 received in the bracket assembly 14. In other arrangements, the spaces between the distances between the two notches 18 can vary as well as the particular positioning of the notches 18. For example, between the central axes 48 of the notches 18 can be at least 3", 4", 5", 6", 7", or more.

In an alternative embodiment, the guide plate 16 is 7.00" wide by 2.25" tall with four 1.00" deep notches 18 that are 0.50". A first notch 18A is inset 0.75" from one side of the guide plate 16 and a second notch 18B is inset 0.75" from the opposite side of the guide plate 16. A third notch 18C and a fourth notch 18D are located adjacent the second notch 18B such that 0.50" of the guide plate 16 is between the respective notches 18 and 2.50" is between the fourth notch 18D and the first notch 18A. In this arrangement, the distance between the central axis 48 of the first notch 18A and the central axis 48 of the second notch 18B is 6.00" to accommodate 6" irons 42 being attached to shafts 30 received in the bracket assembly 14. The distance between the central axis 48 of the first notch 18A and the central axis 48 of the third notch 18C is 5.00" to accommodate 5" irons 42. The distance between the central axis 48 of the first notch 18A and the central axis 48 of the fourth notch 18D is 3.00" to accommodate 3" irons 42. In other arrangements, the positioning of the notches 18A-D can vary from their particular location on the guide plate 16.

In other arrangements, the three or more notches 18 are cut from the guide plate 16 to accommodate more than one size of iron 42 when the irons 42 abut a front side 50 of the guide plate 16. In one arrangement, a first notch 18A is positioned on one side of the guide plate 16 and a plurality of notches 18 are positioned on the other side of the guide plate 16 to allow for the selective placement of branding irons 14 to accommodate various iron 14 sizes. In variations of this arrangement, the width of the guide plate 16 is shortened or lengthened accordingly to the length necessary for the distance between the desired irons 42.

In operation, the irons 42 of the branding, irons 14 are heated or cooled to a branding temperature. The shafts 30 of the branding irons 14 are placed through the notches 18 of the guide plate 16 and within grooves 28 of the guides 26, such that shaft extends through the notches 18. In this arrangement, the handle 36 of the branding iron 14 is positioned rearward of the guide plate 16 and the iron 42 is positioned forwardly of the guide plate. The sleeves 40 are slid along the shaft 30 up to the rear side 24 of the guide plate 16 such that the sleeves 40 cover the guides 26. When the sleeves 40 are covering both the guides 26 and the shaft 30, the branding iron 14 cannot be lifted off of the guide 26, but is still free to be moved back and forth and independently of any other branding iron 14. Because the iron 42 is larger than the notch 18, however, the iron 42 cannot pass the guide plate 16

Overall, the process to lock the branding irons 14 in place once at a branding temperature is very quick and simple preventing the need for reheating or retool ng, thereby increasing efficiency. During the branding process, the branding irons 14 can still move back and forth independently of each other along guides 26 as the guides 26 do not actually lock into place and are not fixedly attached to anything, which allows the branding irons 14 to move if livestock moves during the branding process allowing a superior brand and preventing the need for repeat branding.

When branding is completed, the sleeves 40 are slid towards the branding iron 14 handles 36 and the branding irons 14 are able to be quickly removed from the bracket assembly 12. The iron 42 is then replaced by unthreading the threaded portion 38 of the shaft 30 from the opening 44 in the iron 42 and threading a new iron 42 on the shaft 30. Alternatively, the shaft 30 is unscrewed from the connector 46 that is attached to the iron 42.

Therefore, a branding bracket 10 has been provided that improves upon the state of the art, allows the application of numerous branding irons 14 at once, is more inefficient, allows for independent movement of branding irons 14, reduces the duration of animal discomfort, allows for rapid change in branding irons 14, accommodates different sizes of brands, is comfortable for the user to use, is easy to use, and is inexpensive.

From the above discussion and accompanying figures and claims it will be appreciated that the brand bracket 10 offers many advantages over the prior art. It will be appreciated by those skilled in the art that other various modifications could be made to the device without parting from the spirit and scope of this invention. All such modifications and changes fall within the scope of the claims and are intended to be covered thereby.

What is claimed is:

1. A branding bracket, comprising:
   a guide plate having at least two notches cut from a top surface of the guide plate, wherein each terminates in a bottom above a bottom surface of the guide plate;
   guides connected to the guide plate adjacent the bottom of the at least two notches, wherein the guides extend outwardly from the guide plate; and at least one branding iron received with-in at least one notch.

2. The branding bracket of claim 1 further comprising a removable sleeve received over a shaft of the at least one branding iron.

3. The branding bracket of claim 1 wherein the guides have grooves.

4. The branding bracket of claim 1 wherein when two branding irons are received within the guide plate, the branding irons are independently moveable.

5. The branding bracket of claim 1 wherein the guide plate has four notches.

6. The branding bracket of claim 5 wherein a first notch has a central axis positioned at least 3" from a second notch.

7. The branding bracket of claim 5 wherein a first notch has a central axis positioned at least 3" from a fourth notch.

8. The branding bracket of claim 5 wherein a first notch has a central axis positioned at least 4" from a second notch.

9. The branding bracket of claim 5 wherein a first notch has a central axis positioned at least 5" from a second notch.

10. The branding bracket of claim 2 wherein the sleeve is sized and shaped to be received over the guides.

11. The branding bracket of claim 1 wherein the branding iron has a shaft and an iron.

12. The branding bracket of claim 1 wherein the guides each have a groove that is substantially similar to the shape of a bottom of the at least two notches.

13. A branding bracket, comprising:
a guide plate having at least two notches;
guides connected to the guide plate adjacent a bottom of the at least two notches, wherein the guides extend outwardly from the guide plate;
at least one branding iron received within at least one notch;
at least one sleeve slidably received over a shaft of the branding iron;
wherein the sleeve is slidable to an unlocked position that covers the shaft of the ironing brand and not the guide to permit removal of the shaft from the guide plate;
wherein the sleeve is slidable to a locked position that covers the shaft of the ironing brand and the guide to prevent removal of the shaft from the guide plate.

14. The branding bracket of claim 13 wherein when two branding irons are received within the guide plate in the locked position, the branding irons are independently moveable from one another.

* * * * *